United States Patent
Baba et al.

(10) Patent No.: US 10,027,953 B2
(45) Date of Patent: Jul. 17, 2018

(54) DETERMINATION METHOD AND DETERMINATION APPARATUS

(71) Applicant: FUJITSU LIMITED, Kawasaki-shi, Kanagawa (JP)

(72) Inventors: Kozo Baba, Oita (JP); Norio Hashiguchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 367 days.

(21) Appl. No.: 14/662,777

(22) Filed: Mar. 19, 2015

(65) Prior Publication Data

US 2015/0304650 A1   Oct. 22, 2015

(30) Foreign Application Priority Data

Apr. 18, 2014   (JP) .................. 2014-086771

(51) Int. Cl.
| | |
|---|---|
| H04N 7/18 | (2006.01) |
| H04N 17/00 | (2006.01) |
| G06K 9/00 | (2006.01) |
| G06T 7/73 | (2017.01) |
| G06K 9/52 | (2006.01) |

(52) U.S. Cl.
CPC ....... H04N 17/002 (2013.01); G06K 9/00791 (2013.01); G06K 9/52 (2013.01); G06T 7/73 (2017.01); *G06T 2207/30244* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 6,963,661 B1 | 11/2005 | Hattori et al. | |
| 6,993,159 B1 * | 1/2006 | Ishii | B60R 1/00 345/419 |
| 8,594,370 B2 | 11/2013 | Schamp et al. | |

(Continued)

FOREIGN PATENT DOCUMENTS

| | | |
|---|---|---|
| JP | 8-285534 | 11/1996 |
| JP | 2004-239613 | 8/2004 |

(Continued)

OTHER PUBLICATIONS

U.S. Non-Final Office Action dated Apr. 26, 2017 for copending U.S. Appl. No. 14/672,565, 25 pages.

(Continued)

*Primary Examiner* — Sath V Perungavoor
*Assistant Examiner* — Xiaolan Xu
(74) *Attorney, Agent, or Firm* — Fujitsu Patent Center

(57) ABSTRACT

An image processing apparatus includes an acquiring unit and a determining unit. For example, the acquiring unit acquires an imaging image captured by a camera mounted on a vehicle and registers the acquired imaging image in drive recorder information. When a vanishing point is detected from the imaging image, the determining unit determines that the imaging direction of the imaging device is normal such that the front of the vehicle is normally imaged. When the vanishing point is not detected from the acquired the imaging image, the determining unit determines that the imaging direction of the imaging device is abnormal such that the front of the vehicle is not normally imaged.

9 Claims, 7 Drawing Sheets

(56) References Cited

U.S. PATENT DOCUMENTS

| | | |
|---|---|---|
| 8,687,070 B2 | 4/2014 | Chen et al. |
| 2003/0202694 A1 | 10/2003 | Shima |
| 2004/0172173 A1 | 9/2004 | Goto et al. |
| 2004/0201483 A1 | 10/2004 | Stam et al. |
| 2009/0290809 A1 | 11/2009 | Yamada |
| 2010/0054542 A1 | 3/2010 | Archibald et al. |
| 2010/0080467 A1* | 4/2010 | Sakurai ............ G06K 9/00798 382/195 |
| 2011/0311156 A1 | 12/2011 | Seo et al. |
| 2013/0321630 A1* | 12/2013 | Shin ................ G08G 1/167 348/148 |
| 2015/0154460 A1 | 6/2015 | Baba et al. |
| 2015/0169970 A1 | 6/2015 | Baba et al. |
| 2015/0302588 A1 | 10/2015 | Baba et al. |
| 2015/0304651 A1 | 10/2015 | Baba et al. |

FOREIGN PATENT DOCUMENTS

| | | |
|---|---|---|
| JP | 2008-123036 | 5/2008 |
| JP | 2010-183294 A | 8/2010 |
| WO | 2009/001510 A1 | 12/2008 |
| WO | 2014/033885 A1 | 3/2014 |
| WO | 2014/033936 A1 | 3/2014 |
| WO | 2014/045344 A1 | 3/2014 |

OTHER PUBLICATIONS

Restriction Requirement dated Jan. 17, 2017 for copending U.S. Appl. No. 14/666,552, 5 pages.

U.S. Non-Final Office Action dated May 19, 2016 for copending U.S. Appl. No. 14/666,552, 25 pages.

Office Action dated Jun. 12, 2017 for copending U.S. Appl. No. 14/666,552, 31 pages.

U.S. Office Action dated Nov. 2, 2017 for copending U.S. Appl. No. 14/672,565, 36 pages.

Japanese Office Action dated Sep. 12, 2017 for corresponding Japanese Patent Application No. 2014-086682, with English Translation, 7 pages.

Japanese Office Action dated Sep. 12, 2017 for corresponding Japanese Patent Application No. 2014-086771, with English Translation, 6 pages.

Japanese Office Action dated Nov. 21, 2017 for corresponding Japanese Application No. 2014-086526, with English Translation, 5 pages.

U.S. Office Action dated Sep. 28, 2017 for co-pending U.S. Appl. No. 14/662,552, 25 pages.

U.S. Office Action dated May 3, 2018 for copending U.S. Appl. No. 14/666,552, 39 pages.

* cited by examiner

| FRAME NUMBER | DATE AND TIME | SPEED | ACCELERA-TION | POSITION COORDINATES | IMAGE |
|---|---|---|---|---|---|
| ... | | | | | |
| N-1 | DATE AND TIME XN-1 | SPEED AN-1 | ACCELERA-TION BN-1 | xn-1, yn-1 | IMAGE DATA IN FRAME N-1 |
| N | DATE AND TIME XN | SPEED AN | ACCELERA-TION BN | xn, yn | IMAGE DATA IN FRAME N |
| N+1 | DATE AND TIME XN+1 | SPEED AN+1 | ACCELERA-TION BN+1 | xn+1, yn+1 | IMAGE DATA IN FRAME N+1 |
| ... | | | | | |

FIG.4

| FRAME NUMBER | STRAIGHT LINE IDENTIFICATION NUMBER | STARTING POINT COORDINATES | END POINT COORDINATES |
|---|---|---|---|
| ... | | | |
| N | 101 | (a1, b1) | (c1, d1) |
| | 102 | (a2, b2) | (c2, d2) |
| | 103 | (a3, b3) | (c3, d3) |
| ... | | | |
| N+10 | 501 | (a4, b4) | (c4, d4) |
| | 502 | (a5, b5) | (c5, d5) |
| | 503 | (a6, b6) | (c6, d6) |
| ... | | | |

FIG.5

| FRAME NUMBER | STRAIGHT LINE IDENTIFICATION NUMBER | STARTING POINT COORDINATES | END POINT COORDINATES |
|---|---|---|---|
| ... | | | |
| N | 601 | (a7, b7) | (c7, d7) |
| | 602 | (a8, b8) | (c8, d8) |
| | 603 | (a9, b9) | (c9, d9) |
| ... | | | |
| N+10 | 801 | (a10, b10) | (c10, d10) |
| | 802 | (a11, b11) | (c11, d11) |
| | 803 | (a12, b12) | (c12, d12) |
| ... | | | |

FIG.6
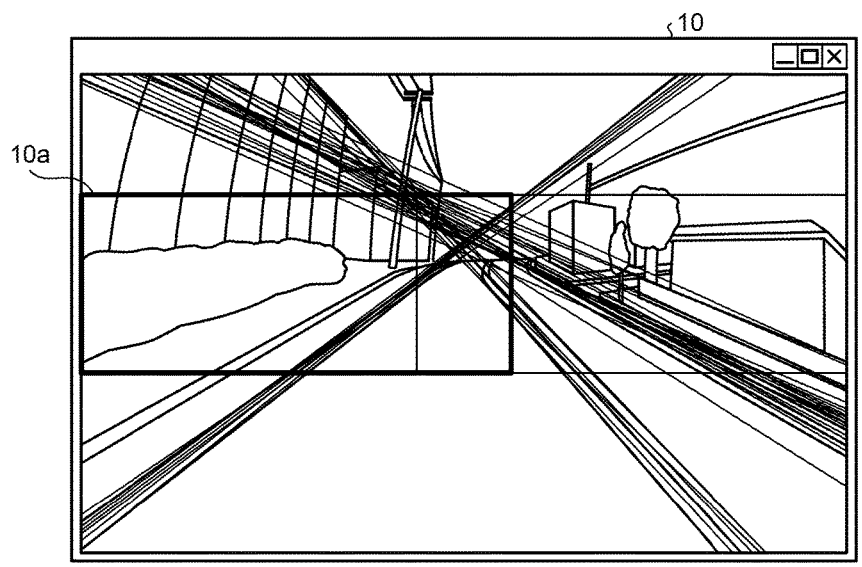
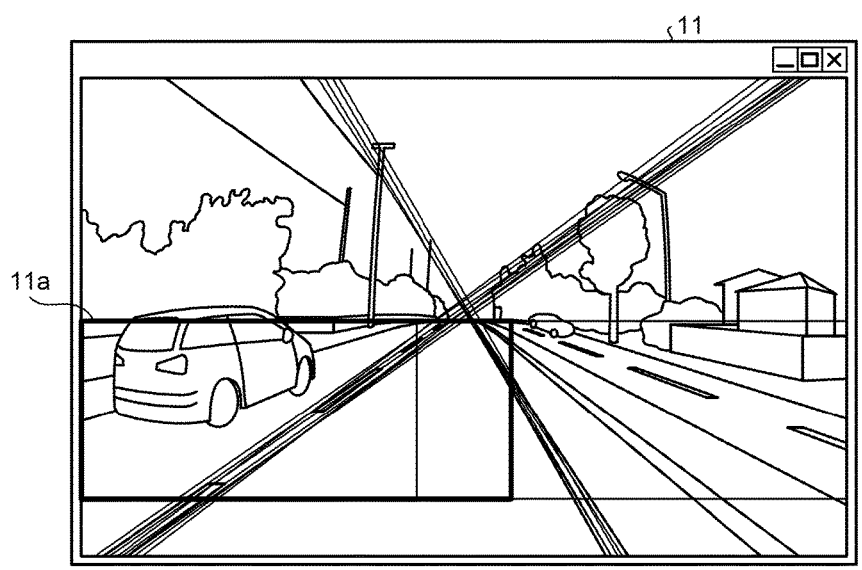

FIG.7
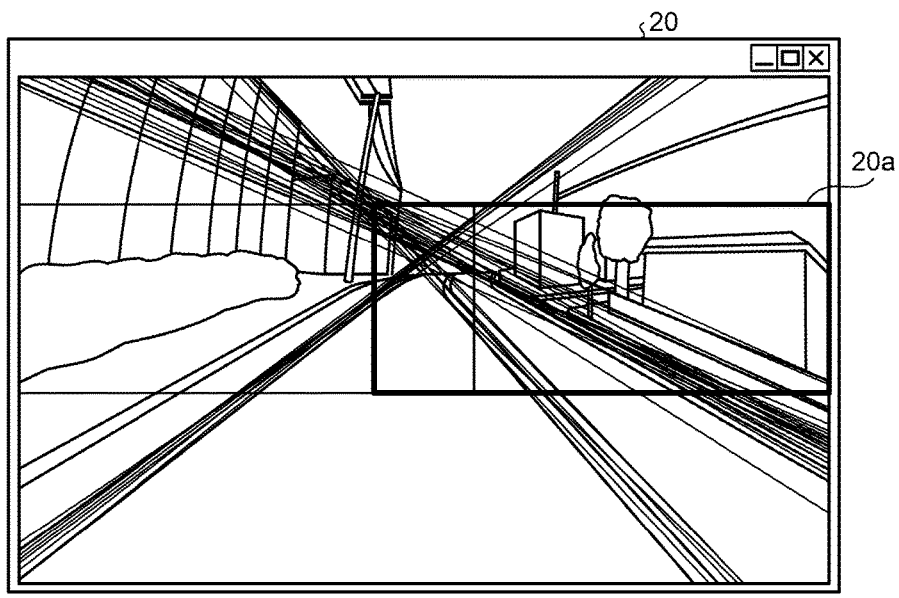
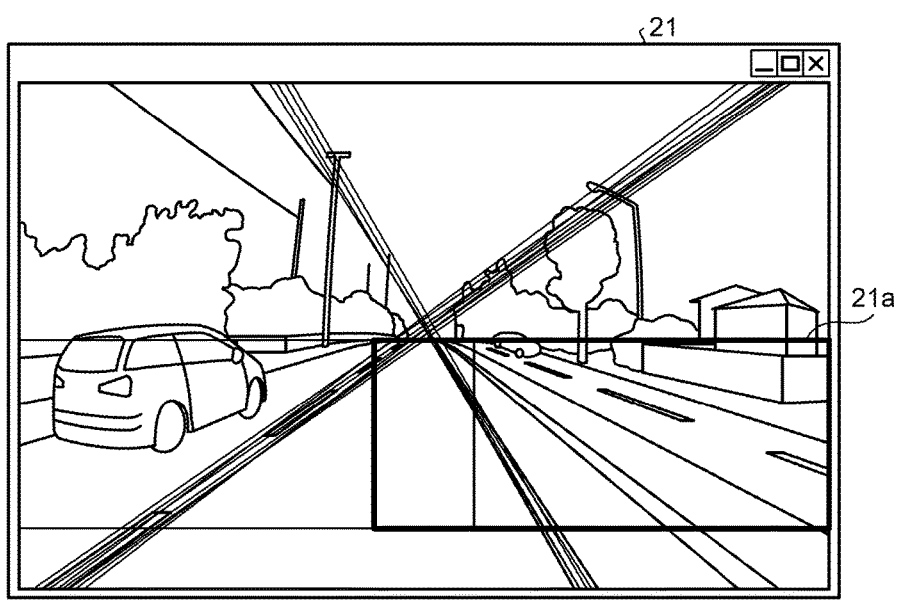

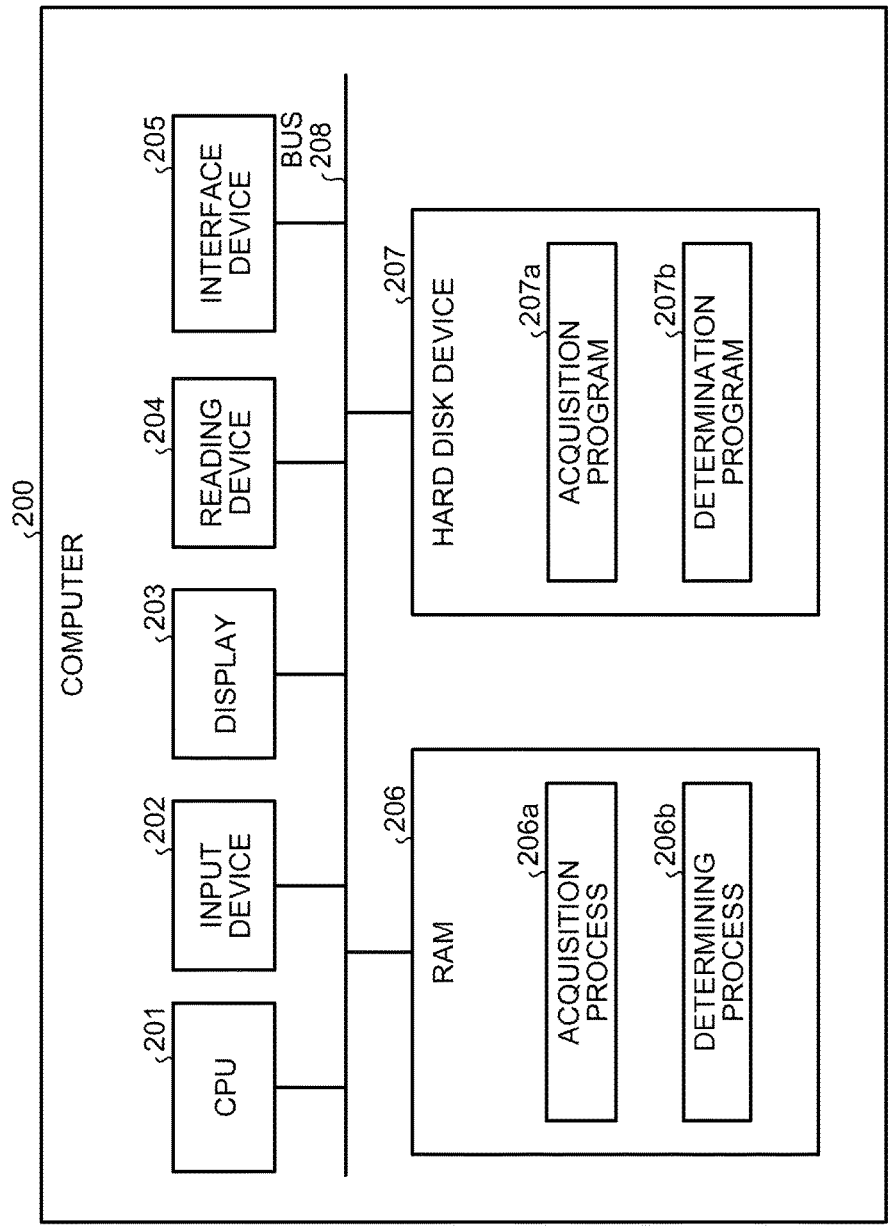

DETERMINATION METHOD AND DETERMINATION APPARATUS

CROSS-REFERENCE TO RELATED APPLICATION(S)

This application is based upon and claims the benefit of priority of the prior Japanese Patent Application No. 2014-086771, filed on Apr. 18, 2014, the entire contents of which are incorporated herein by reference.

FIELD

The embodiment discussed herein is directed to a determination method and determination apparatus.

BACKGROUND

If it is possible to inform a driver of information on a potentially dangerous location where an event of a near miss, such as a vehicle accidentally contacts with a pedestrian who is crossing a road, that gives a driver a shock or a scary tends to occur, the occurrence of an accident can be prevented. Therefore, there are conventional technologies of detecting a near miss by analyzing image data recorded in a drive recorder. These related-art examples are described, for example, Japanese Laid-open Patent Publication No. 08-285534, Japanese Laid-open Patent Publication No. 2004-239613, and Japanese Laid-open Patent Publication No. 2008-123036.

SUMMARY

According to an aspect of an embodiment, a determination method includes acquiring an imaging image from an imaging device mounted on a vehicle; and determining normality of an imaging direction of the imaging device in accordance with whether a vanishing point is detected from the acquired imaging image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram illustrating an example of the data structure of a first straight line table;

FIG. 5 is a schematic diagram illustrating an example of the data structure of a second straight line table;

FIG. 6 is a schematic diagram (No. 1) for giving a supplementary explanation of a process performed by a determining unit;

FIG. 7 is a schematic diagram (No. 2) for giving a supplementary explanation of a process performed by the determining unit;

FIG. 9 is a block diagram illustrating an example of a computer that executes a determination program for determining the normality of an imaging direction.

DESCRIPTION OF EMBODIMENTS

The conventional technologies are considered on the basis of the assumption that image data corresponding to an object to be analyzed is image data imaged by an imaging device that is normally arranged in a vehicle. Consequently, if an analysis is performed on image data imaged by an imaging device that is not normally arranged, an effective analysis result is not sometimes obtained.

A preferred embodiment of a determination method for determining the normality of an imaging direction, a determination program for determining the normality of the imaging direction, and a determination device for determining the normality of the imaging direction disclosed in the present invention will be described in detail below with reference to the accompanying drawings. The present invention is not limited to the embodiment.

Figure 1:
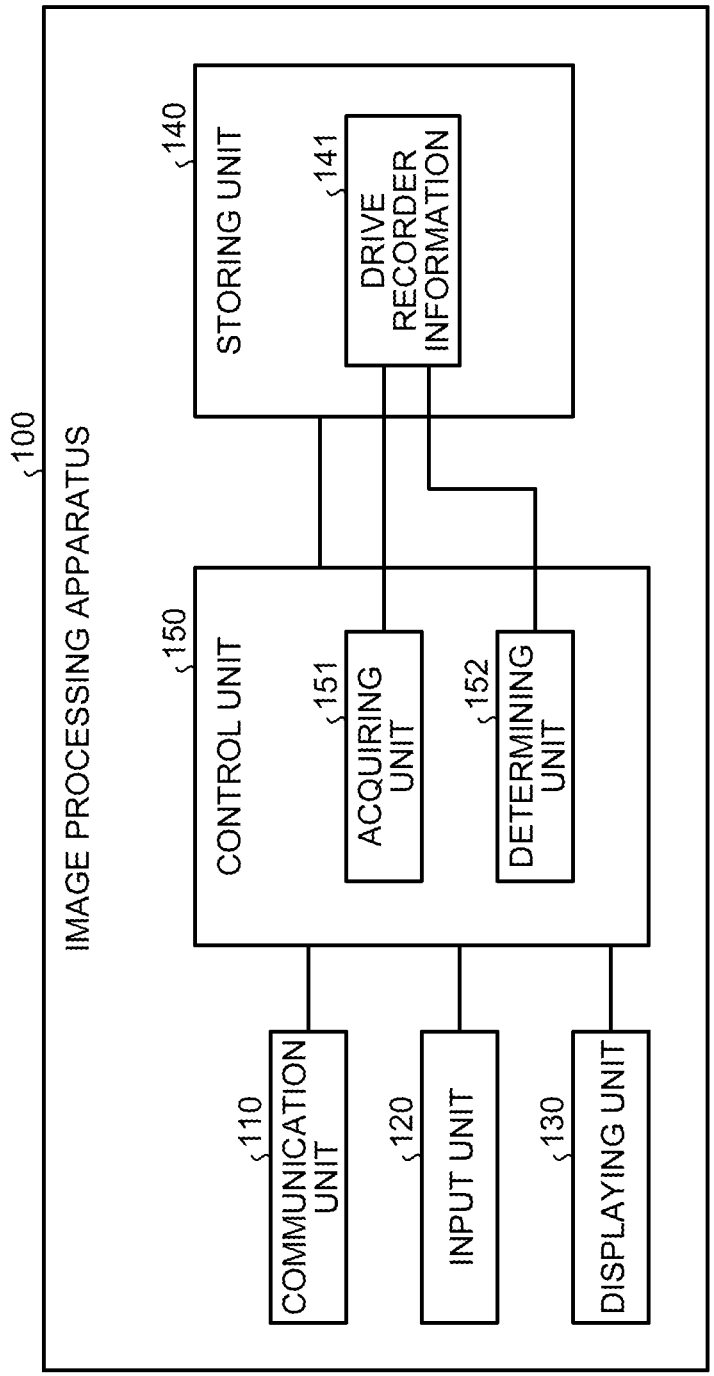
FIG. 1 is a functional block diagram illustrating the configuration of an image processing apparatus according to an embodiment of the present invention.

FIG. 1 is a functional block diagram illustrating the configuration of an image processing apparatus according to an embodiment of the present invention. An image processing apparatus is an example of a determination device of the normality of an imaging direction. As illustrated in FIG. 1, this image processing apparatus includes a communication unit 110, an input unit 120, a displaying unit 130, a storing unit 140, and a control unit 150.

The communication unit 110 is a processing unit that performs data communication with another device via a network. For example, the communication unit 110 corresponds to a communication device or the like.

The input unit 120 is an input device that inputs various kinds of data to an image processing apparatus 100. For example, the input unit 120 corresponds to a keyboard, a mouse, a touch panel, or the like. The displaying unit 130 is a display device that displays data output from the control unit 150. For example, the displaying unit 130 corresponds to a liquid crystal display, a touch panel, or the like.

The storing unit 140 is a storing unit that stores therein drive recorder information 141. The storing unit 140 corresponds to a storage device, such as a semiconductor memory device including, for example, a random access memory (RAM), a read only memory (ROM), a flash memory, or the like.

Figures 2, 3:
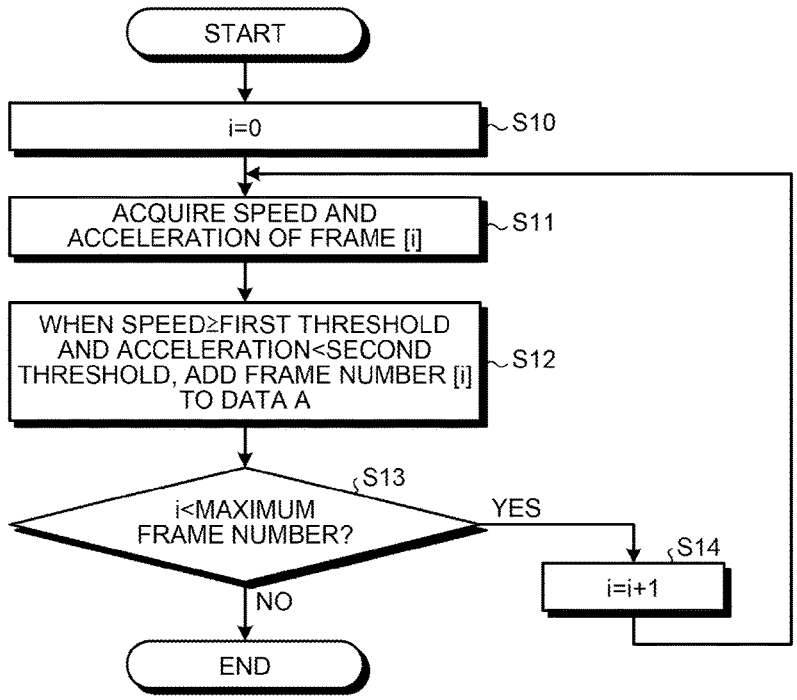
FIG. 2 is a schematic diagram illustrating an example of the data structure of drive recorder information.
FIG. 3 is a flowchart illustrating the flow of a process of acquiring image data on an image imaged by a camera during driving on a straight line.

The drive recorder information 141 includes various kinds of data recorded by a drive recorder. FIG. 2 is a schematic diagram illustrating an example of the data structure of drive recorder information. As illustrated in FIG. 2, the drive recorder information 141 stores therein, in an associated manner, a frame number, the date and time, the speed, the acceleration, the position coordinates, and an image.

The frame number is the number that is used to uniquely identify a frame. The date and time is date and time at which a subject frame is imaged. The speed is a speed of a vehicle having mounted thereon a drive recorder at the time of imaging the subject frame. The acceleration is an acceleration of a vehicle having mounted thereon a drive recorder at the time of imaging the subject frame. The position coordinates are the position coordinates of a vehicle having mounted thereon a drive recorder at the time of imaging the subject frame. Furthermore, an image is image data in a subject frame.

The control unit 150 includes an acquiring unit 151 and a determining unit 152. The control unit 150 corresponds to, for example, an integrated circuit, such as an application specific integrated circuit (ASIC), a field programmable gate array (FPGA), or the like. Furthermore, the control unit 150 corresponds to, for example, an electronic circuit, such as a central processing unit (CPU), a micro processing unit (MPU), or the like.

The acquiring unit 151 is a processing unit that acquires drive recorder information from a drive recorder or the like. The acquiring unit 151 registers, in the storing unit 140, drive recorder information acquired from the drive recorder or the like as the drive recorder information 141. Furthermore, the acquiring unit 151 may also sequentially acquire image data from an imaging device, such as a camera or the like, and then sequentially register the acquired image data in the drive recorder information 141.

The determining unit 152 is a processing unit that detects a vanishing point from image data and determines, on the basis of the detection result, the normality of an imaging direction of an imaging device, such as a camera or the like.

The determining unit 152 performs a process of acquiring image data imaged by a camera when a vehicle is driving on a straight line and performs a process of detecting a vanishing point.

In the following, a description will be given of an example of a process in which the determining unit 152 acquires image data imaged by a camera when a vehicle is driving on a straight line. The determining unit 152 accesses the drive recorder information 141, specifies image data in a frame in which the speed is equal to or greater than a first threshold and the acceleration is less than a second threshold, and then acquires the specified image data. The image data in the frame specified by the determining unit 152 corresponds to the image data captured by a camera during driving on a straight line.

FIG. 3 is a flowchart illustrating the flow of a process of acquiring image data on an image imaged by a camera during driving on a straight line. As illustrated in FIG. 3, the determining unit 152 sets the value of i to zero (Step S10). The determining unit 152 acquires the speed and the acceleration of the frame number of [i] (Step S11).

If the speed is equal to or greater than the first threshold and the acceleration is less than the second threshold, the determining unit 152 adds image data with the frame number of [i] to data A (Step S12). The determining unit 152 determines whether the value of i is less than the maximum frame number (Step S13). If the value of i is not less than the maximum frame number (No at Step S13), the determining unit 152 ends the process of acquiring the image data imaged by the camera during the driving.

In contrast, if the value of i is less than the maximum frame number (Yes at Step S13), the determining unit 152 updates the value of i to the value that is obtained by adding 1 to the value of i (Step S14) and then proceeds to Step S11.

Then, the determining unit 152 performs a process of detecting a vanishing point. By using the process described with reference to FIG. 3, the determining unit 152 attempts to extract straight lines from image data in each frame with a frame number stored in the data A.

By performing Canny filter on image data, the determining unit 152 creates edge image data in which an edge component is enhanced. After the determining unit 152 has created the edge image data, the determining unit 152 performs a process of extracting straight lines from the left part of the edge image data and performs a process of extracting straight lines from the right part of the edge image data.

In the following, a description will be given of a process in which the determining unit 152 extracts straight lines from the left part of the edge image data. The determining unit 152 extracts straight lines by performing the Hough transform on the left part of the edge image data. The determining unit 152 specifies, from among the extracted straight lines, a straight line with diagonally right up and registers information on the specified straight lines in the first straight line table. The determining unit 152 specifies straight lines included in, for example, the angular range between $\pi/8$ and $3\pi/8$ formed by the X-axis of the edge image data and the straight lines and then registers the information on the specified straight lines in the first straight line table.

The first straight line table is the table that stores therein information on the straight lines, from among the straight lines extracted from the left part of the edge image data, that are included in the angular range between $\pi/8$ and $3\pi/8$ formed with respect to the X-axis. FIG. 4 is a schematic diagram illustrating an example of the data structure of a first straight line table. As illustrated in FIG. 4, for example, the first straight line table stores therein, in an associated manner, the frame number, the straight line identification number, the starting point coordinates, and the end point coordinates. The frame number is the number that is used to uniquely identify a frame. The straight line identification number is information that is used uniquely identify a straight line. The starting point coordinates indicate the coordinates of the starting point of a straight line on image data. The end point coordinates indicate the coordinates of the end point of the straight line on the image data.

FIG. 6 is a schematic diagram (No. 1) for giving a supplementary explanation of a process performed by a determining unit. For example, the determining unit 152 may also extract straight lines from a predetermined area in the left part. As illustrated in FIG. 6, from among the straight lines extracted from an area 10a in image data 10, the determining unit 152 may also specify the straight lines included in the angular range between $\pi/8$ and $3\pi/8$ formed by the X-axis of the edge image data and the straight lines and may also register the information on the specified straight lines in the first straight line table. From among the straight lines extracted from an area 11a in image data 11, the determining unit 152 may also specify the straight lines included in the angular range between $\pi/8$ and $3\pi/8$ formed by the X-axis of the edge image data and the straight lines and may also register the information on the specified straight lines in the first straight line table. Furthermore, the determining unit 152 may also extract straight lines from the entirety of the left half of the image data that is used as the target; may also specify, from among the extracted straight lines, the straight lines included in the angular range between $\pi/8$ and $3\pi/8$ formed by the X-axis of the edge image data and the straight lines; and may also register the information on the specified straight lines in the first straight line table.

In the following, a description will be given of a process in which the determining unit 152 extracts straight lines from the right part of the edge image data. The determining unit 152 extracts straight lines by performing the Hough transform on the right portion of the edge image data. The determining unit 152 specifies, from among the extracted straight lines, the straight lines with diagonally left up and registers the information on the specified straight lines in a second straight line table. The determining unit 152 specifies the straight lines included in the angular range between, for example, 5π/8 and 7π/8 formed by the X-axis of the edge image data and the straight lines and registers the information on the specified straight lines in the second straight line table.

The second straight line table is a table that stores therein information on the straight lines, from among the straight lines extracted from the right part of the edge image data, that are included in the angular range between 5π/8 and 7π/8 formed with respect to the X-axis. FIG. 5 is a schematic diagram illustrating an example of the data structure of a second straight line table. As illustrated in FIG. 5, for example, the second straight line table stores therein, in an associated manner, the frame number, the straight line identification number, the starting point coordinates, and the end point coordinates. Descriptions of the frame number, the straight line identification number, the starting point coordinates, and the end point coordinates are the same as those described with reference to FIG. 4.

FIG. 7 is a schematic diagram (No. 2) for giving a supplementary explanation of a process performed by the determining unit. For example, the determining unit 152 may also extract straight lines from a predetermined area in the right part. As illustrated in FIG. 7, from among the straight lines extracted from an area 20a in image data 20, the determining unit 152 may also specify the straight lines included in the angular range between 5π/8 and 7π/8 formed by the X-axis of the edge image data and the straight lines and may also register the information on the specified straight lines in the second straight line table. From among the straight lines extracted from an area 21a in an image data 21, the determining unit 152 may also specify the straight lines included in the angular range between 5π/8 and 7π/8 formed by the X-axis of the edge image data and the straight lines and registers the information on the specified straight lines in the second straight line table. Furthermore, the determining unit 152 may also extract straight lines from the entirety of the right half of the image data that is used as the target; may also specify, from among the extracted straight lines, the straight lines included in the angular range between 5π/8 and 7π/8 formed by the X-axis of the edge image data and the straight line; and may also register the information on the specified straight lines in the second straight line table.

Then, the determining unit 152 determines, on the basis of the first straight line table and the second straight line table, whether a vanishing point is present. The determining unit 152 counts, for each frame number, the number of the straight lines detected from the left part of an edge image and the number of the straight lines detected from the right part of the edge image. For the edge image with the frame number of N, if the sum of the number of the straight lines detected from the left part and the number of the straight lines detected from the right part is equal to or greater than a third threshold, the determining unit 152 determines that a vanishing point is included in the image data of the frame number of N.

For each of the edge images with the frame numbers, the determining unit 152 calculates the sum value of the number of straight lines of the left part and the right part. If the calculated value is equal to or greater than the third threshold, the determining unit 152 determines that a vanishing point is included in the image data with the subject frame number.

If the determining unit 152 determines that a vanishing point is included in one of the pieces of image data with a frame number, the determining unit 152 determines that the imaging direction of a camera is normal such that the front of a vehicle is normally imaged. If the determining unit 152 determines that a vanishing point is not included in image data with a frame number, the determining unit 152 determines that the imaging direction of a camera is abnormal such that the front of a vehicle is not normally imaged.

Namely, if the condition of Equation (1) is satisfied, the determining unit 152 determines that the imaging direction of a camera is normal such that the front of a vehicle is normally imaged. If the condition of Equation (1) is not satisfied, the determining unit 152 determines that the imaging direction of a camera is abnormal such that the front of a vehicle is not normally imaged.

number of straight lines detected from the left part of an edge image(the angular range of the straight lines is between π/8 and 3π/8)+number of straight lines detected from the right part of an edge image(the angular range of the straight lines is between 5π/8 and 7π/8)≥third threshold (1)

Furthermore, if a vanishing point is included in image data the number of which is equal to or greater than a predetermined number, the determining unit 152 may also determine that the imaging direction of a camera is normal such that the front of a vehicle is normally imaged. If a vanishing point is not included in image data the number of which is equal to or greater than a predetermined number, the determining unit 152 may also determine that that the imaging direction of a camera is abnormal such that the front of a vehicle is not normally imaged.

Figure 8:
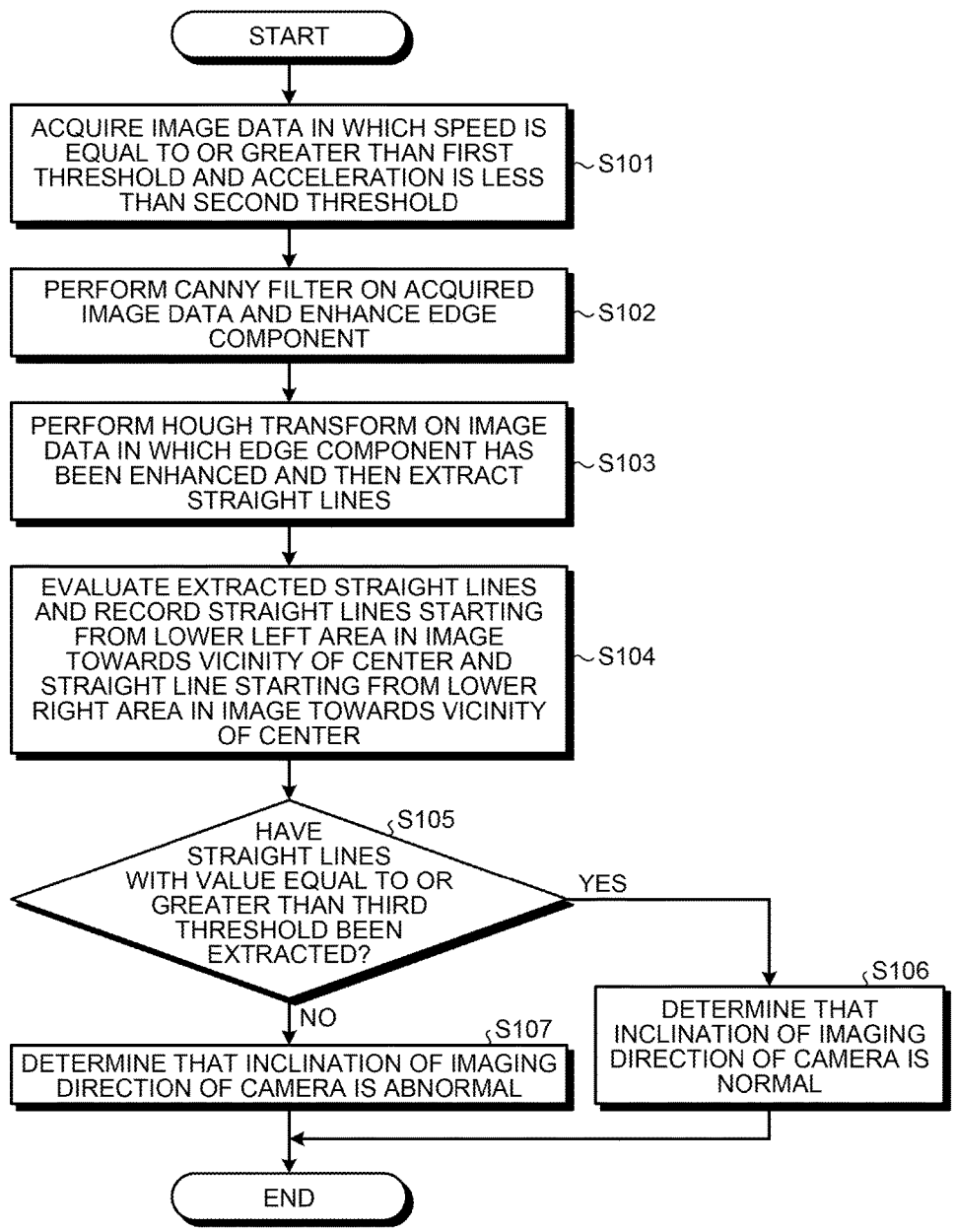
FIG. 8 is a flowchart illustrating the flow of a process performed by the image processing apparatus according to the embodiment.

In the following, a description will be given of the flow of a process performed by the image processing apparatus 100 according to the embodiment. FIG. 8 is a flowchart illustrating the flow of a process performed by the image processing apparatus according to the embodiment. As illustrated in FIG. 8, the image processing apparatus 100 acquires image data in which the speed is equal to or greater than the first threshold and the acceleration is less than the second threshold (Step S101).

The determining unit 152 in the image processing apparatus 100 performs the Canny filter on the acquired image data and then enhances the edge component (Step S102). The determining unit 152 performs the Hough transform on the image data in which the edge component has been enhanced and then extracts straight lines (Step S103).

The determining unit 152 evaluates the extracted straight lines and records the straight lines starting from the lower left area in an image towards the vicinity of the center and the straight line starting from the lower right area in the image towards the vicinity of the center (Step S104). The determining unit 152 determines whether the determining unit 152 has extracted straight lines with a value equal to or greater than the third threshold (Step S105).

If the determining unit 152 has extracted straight lines with a value equal to or greater than the third threshold (Yes at Step S105), the determining unit 152 determines that the inclination of the imaging direction of the camera is normal (Step S106). In contrast, if the determining unit 152 has not extracted straight lines with a value equal to or greater than the third threshold (No at Step S105), the determining unit 152 determines that the inclination of the imaging direction of the camera is abnormal (Step S107).

In the following, the effect of the image processing apparatus 100 according to the embodiment will be described. On the basis of image data imaged by a camera mounted on a vehicle, the image processing apparatus 100 determines the normality of the imaging direction of a camera in accordance with whether a vanishing point is detected from the camera. Consequently, it is possible to evaluate the normality of the imaging direction of an imaging device.

For example, if a vanishing point is detected from image data, the image processing apparatus 100 determines that the imaging direction of a camera is normal such that the front of the vehicle is normally imaged. In contrast, if a vanishing point is not detected, the image processing apparatus 100 determines that the imaging direction of a camera is abnormal such that the front of a vehicle is not normally imaged. Consequently, it is possible to appropriately evaluate the normality of the imaging direction of a camera in a simple process.

The process performed by the determining unit 152 described above is only an example. The determining unit 152 may also determine the normality of the imaging direction of a camera by using another process. In a description below, another process performed by the determining unit 152 will be described.

If a vanishing point detected from image data is within a predetermined range, the determining unit 152 may also determine that the imaging direction of a camera is normal such that the front of a vehicle is normally imaged. Furthermore, if a vanishing point detected from image data is not within the predetermined range, the determining unit 152 may also determine that the imaging direction of a camera is abnormal such that the front of a vehicle is not normally imaged. Furthermore, the determining unit 152 may also extract a straight line on the basis of a road sign line that is included in the lower half of the image data.

For example, in FIG. 6, the determining unit 152 specifies, from the left part area, such as the areas 10a and 11a or the like, straight lines included in the angular range between $\pi/8$ and $3\pi/8$ formed with respect to the X-axis. If the number of the specified straight lines is equal to or greater than a predetermined number, the determining unit 152 determines that the vanishing point detected from the image data is within the predetermined range. In contrast, the determining unit 152 specifies, from the left part area, such as the areas 10a and 11a or the like, the straight lines included in the angular range between $\pi/8$ and $3\pi/8$ formed with respect to the X-axis. If the number of the specified straight lines is less than a predetermined number, the determining unit 152 determines that the vanishing point detected from the image data is not within the predetermined range.

For example, in FIG. 7, the determining unit 152 specifies, from the left part area, such as the areas 20a and 21a or the like, the straight lines included in the angular range between $5\pi/8$ and $7\pi/8$ formed with respect to the X-axis. If the number of the specified straight lines is equal to or greater than a predetermined number, the determining unit 152 determines that the vanishing point detected from the image data is within the predetermined range. In contrast, the determining unit 152 specifies, from the left part area, such as the areas 20a and 21a or the like, the straight lines included in the angular range between $5\pi/8$ and $7\pi/8$ formed with respect to the X-axis. If the number of the specified straight lines is less than a predetermined number, the determining unit 152 determines that the vanishing point detected from the image data is not within the predetermined range.

As described above, the determining unit 152 limits the area in which straight lines are detected; extracts straight lines from the limited area; and determines whether a vanishing point is present. Consequently, it is possible to evaluate the normality of the imaging direction of the imaging device while reducing the processing load.

Furthermore, the determining unit 152 according to the embodiment determines, depending on whether the condition of Equation (1) is satisfied, whether the imaging direction of a camera is normal such that the front of a vehicle is normally imaged; however, the method is not limited thereto. For example, even if the imaging direction of a camera is appropriate, there may be a case in which an erroneous determination indicating that an imaging direction is not appropriate is obtained because the number of straight lines extracted from the left part or the right part of image data is reduced due to the shape of a road and, as a result, the condition of Equation (1) is not satisfied.

Therefore, if one of the conditions of Equation (2) and Equation (3) is satisfied, the determining unit 152 may also determine whether the imaging direction of a camera is normal such that the front of a vehicle is normally imaged.

$$\text{number of straight lines detected from the left part of an edge image(the angular range of the straight lines is between } \pi/8 \text{ and } 3\pi/8) \geq \text{fourth threshold} \quad (2)$$

$$\text{number of straight lines detected from the right part of an edge image(the angular range of the straight lines is between } 5\pi/8 \text{ and } 7\pi/8) \geq \text{fourth threshold} \quad (3)$$

In the following, a description will be given of an example of a computer that executes a determination program of the normality of an imaging direction that implements the same function as that performed by the image processing apparatus 100 described in the above embodiment. FIG. 9 is a block diagram illustrating an example of a computer that executes a determination program for determining the normality of an imaging direction.

As illustrated in FIG. 9, a computer 200 includes a CPU 201 that executes various arithmetic processing, an input device 202 that receives an input of data from a user, and a display 203. Furthermore, the computer 200 includes a reading device 204 that reads a program or the like from a storage medium and an interface device 205 that exchanges data with another computer via a network. Furthermore, the computer 200 includes a RAM 206 and a hard disk device 207 that temporarily store therein various kinds of information. Then, each of the devices 201 to 207 is connected to a bus 208.

The hard disk device 207 includes an acquisition program 207a and a determination program 207b. The CPU 201 reads the acquisition program 207a and the determination program 207b and loads the programs in the RAM 206. The acquisition program 207a functions as an acquisition process 206a. The determination program 207b functions as a determining process 206b.

For example, the acquisition process 206a corresponds to the acquiring unit 151. The determining process 206b corresponds to the determining unit 152.

Furthermore, the acquisition program 207a and the determination program 207b do not need to be stored in the hard disk device 207 in advance from the beginning. For example, the programs are stored in a "portable physical medium", such as a flexible disk (FD), a CD-ROM, a DVD disk, a magneto-optic disk, an IC CARD, or the like that is to be inserted into the computer 200. Then, the computer 200 may also read and execute the acquisition program 207a and the determination program 207b from the portable physical medium.

According to an aspect of an embodiment of the present invention, an advantage is provided in that it is possible to evaluate the normality of an imaging direction of an imaging device.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A determination method executed by a computer, the determination method comprising:
    acquiring images from an imaging device mounted on a vehicle, and storing the acquired images and speed data and acceleration data of the vehicle associated with each of the acquired images in a storing unit;
    acquiring a traveling-straight image from the images stored in the storing unit that is acquired while the vehicle is traveling straight, based on the speed data and the acceleration data of the vehicle stored in the storing unit;
    performing a filter on the traveling-straight image to generate an edge image data, and extracting a plurality of lines from a left part of the edge image data by performing a Hough transform thereon, and from a right part of the edge image data by performing a Hough transform thereon;
    counting a number of the extracted lines that go in an upper right direction from a left area or in an upper left direction from a right area on the edge image data;
    determining whether a vanishing point is detected on the traveling-straight image, based on the counted number; and
    determining normality of an imaging direction of the imaging device in accordance with whether the vanishing point is detected or not.

2. The determination method according to claim 1, wherein
    when the vanishing point is detected on the traveling-straight image, the determining determines that the imaging direction of the imaging device is normal such that a front of the vehicle is normally imaged, and
    when the vanishing point is not detected on the traveling-straight image, the determining determines that the imaging direction of the imaging device is abnormal such that the front of the vehicle is not normally imaged.

3. The determination method according to claim 1, further comprising specifying the vanishing point on the basis of a plurality of sign lines included in the traveling-straight image.

4. A non-transitory computer-readable recording medium storing a program that causes a computer to execute a process comprising:
    acquiring images from an imaging device mounted on a vehicle, and storing the acquired images and speed data and acceleration data of the vehicle associated with each of the acquired images in a storing unit;
    acquiring a traveling-straight image from the images stored in the storing unit that is acquired while the vehicle is traveling straight, based on the speed data and the acceleration data of the vehicle stored in the storing unit;
    performing a filter on the traveling-straight image to generate an edge image data, and extracting a plurality of lines from a left part of the edge image data by performing a Hough transform thereon, and from a right part of the edge image data by performing a Hough transform thereon;
    counting a number of the extracted lines that go in an upper right direction from a left area or in an upper left direction from a right area on the edge image data;
    determining whether a vanishing point is detected on the traveling-straight image, based on the counted number; and
    determining normality of an imaging direction of the imaging device in accordance with whether the vanishing point is detected or not.

5. The non-transitory computer-readable recording medium according to claim 4, wherein
    when the vanishing point is detected on the traveling-straight image, the determining determines that the imaging direction of the imaging device is normal such that a front of the vehicle is normally imaged, and
    when the vanishing point is not detected on the traveling-straight image, the determining determines that the imaging direction of the imaging device is abnormal such that the front of the vehicle is not normally imaged.

6. The non-transitory computer-readable recording medium according to claim 4, further comprising specifying the vanishing point on the basis of a plurality of sign lines included in the traveling-straight image.

7. A determination apparatus comprising a processor configured to:
    acquire images from an imaging device mounted on a vehicle, and store the acquired images and speed data and acceleration data of the vehicle associated with each of the acquired images in a storing unit;
    acquire a traveling-straight image from the images stored in the storing unit that is acquired while the vehicle is traveling straight, based on the speed data and the acceleration data of the vehicle stored in the storing unit;
    perform a filter on the traveling-straight image to generate an edge image data, and extract a plurality of lines from a left part of the edge image data by performing a Hough transform thereon, and from a right part of the edge image data by performing a Hough transform thereon;
    count a number of the extracted lines that go in an upper right direction from a left area or in an upper left direction from a right area on the edge image data;
    determine whether a vanishing point is detected on the traveling-straight image, based on the counted number; and
    determine normality of an imaging direction of the imaging device in accordance with whether the vanishing point is detected or not.

8. The determination apparatus according to claim 7, wherein the processor further configured to
    when the vanishing point is detected on the traveling-straight image, determine that the imaging direction of the imaging device is normal such that a front of the vehicle is normally imaged, and
    when the vanishing point is not detected on the traveling-straight image, determine that the imaging direction of the imaging device is abnormal such that the front of the vehicle is not normally imaged.

9. The determination apparatus according to claim 7, wherein the vanishing point is specified on the basis of a plurality of sign lines included in the traveling-straight image.

* * * * *